United States Patent [19]

Hein

[11] 4,263,750
[45] Apr. 28, 1981

[54] FRAME EDGE FLANGE AND SEALING STRIP THEREFOR

[75] Inventor: Richard D. Hein, Wabash, Ind.

[73] Assignee: The General Tire & Rubber Co., Akron, Ohio

[21] Appl. No.: 26,716

[22] Filed: Apr. 4, 1979

[51] Int. Cl.³ .............................................. E06B 7/16
[52] U.S. Cl. ........................................ 49/490; 49/497
[58] Field of Search ................ 49/490, 488, 491, 496, 49/497; 52/716–718, 823

[56] References Cited

U.S. PATENT DOCUMENTS

| | | | |
|---|---|---|---|
| 2,554,452 | 5/1951 | Bright | 49/491 |
| 2,664,602 | 1/1954 | Bright | 49/491 |
| 2,784,814 | 3/1957 | Bright | |
| 2,794,757 | 6/1957 | Bright | 52/823 X |
| 3,167,825 | 2/1965 | Zoller | 49/490 |
| 3,167,856 | 2/1965 | Zoller | 49/490 X |
| 3,363,364 | 1/1968 | Cadiou | 49/490 |
| 3,363,390 | 1/1968 | Crane et al. | 52/716 |
| 3,706,173 | 12/1972 | Taylor | 49/490 X |
| 4,103,459 | 8/1978 | Barnerias et al. | 49/491 |
| 4,123,100 | 10/1978 | Ellis | 49/490 X |
| 4,143,497 | 3/1979 | Offenbacher | 52/717 X |

Primary Examiner—Philip C. Kannan

[57] ABSTRACT

A structural flange such as that which surrounds an automobile door is covered by a channel-shaped strip that needs no metal carrier to hold it in place on the flange. The channel-shaped strip may serve decorative, protective, or sealing functions, and may be made of either cellular or noncellular rubber, or plastic, or part of the strip may be made of cellular rubber and part of noncellular rubber or plastic. The structural flange has tabs protruding laterally from each of its sides, and the channel-shaped strip has structure that locks the strip in place over these tabs.

11 Claims, 11 Drawing Figures

FRAME EDGE FLANGE AND SEALING STRIP THEREFOR

This invention relates to channel-shaped strips that fit on the ends of structural flanges. An example is the sealing strip that fits around the upper part of an automobile door frame and is designed to seal the space between the door and the frame when the door is closed. The channel-shaped strip often has a special sealing attachment, such as a tubular member of cellular rubber, connected to one of the legs of the channel. The present invention is applicable to all channel-shaped sealing strips that fit on the ends of flanges, including both those with and without special sealing attachments. The invention is also applicable to strips that cover flange ends mainly for decorative and protective purposes, as well as those that are designed primarily as sealing strips.

It has been customary to provide channel-shaped strips that cover the ends of structural flanges with embedded metal carrier members. Often, these carrier members have portions that protrude inwardly from the inside surface of the channel and hook onto the flange in some manner. Examples of such strips and carrier members are shown in U.S. Pat. Nos. 2,554,452; 2,664,602; 2,784,814; and 2,794,757, all issued to T. J. R. Bright.

With other strips, the metal carrier members have no direct contact with the supporting structural flange, but instead there are flexible fingers formed on the insides of the legs of the channel-shaped strip, and the metal carrier member serves as a spring clip that presses these flexible fingers against the sides of the structural flange. Examples of these strip structures are shown in U.S. Pat. Nos. 3,167,825; 3,363,364; and 4,103,459. With most such structures, the strip is held on the flange solely by the friction between the flexible fingers of the strip and the flange. However, in some cases, the fingers engage ridges on the flange to help hold the strip in place.

A problem with the foregoing strip structures is that they require a metal carrier member to hold them on the flange. The metal carrier represents an additional cost item both with respect to the cost of manufacturing the carrier itself and with respect to the cost of embedding the carrier during the manufacture of the channel-shaped strip. Also, in spite of the spring loading of the metal carrier, the channel-shaped strip can nevertheless be pulled off its flange with very little force, especially if it is removed from the flange and put back a number of times.

A channel-shaped strip that does not employ a metal carrier is a hard plastic window-framing strip shown in U.S. Pat. No. 3,363,390. This strip relies solely on the resiliency of flexible fingers on the insides of its legs to hold it to a glass pane. While such fingers do not provide a great amount of resistance to the strip being pulled off, the situation in which the strip is employed does not require a great amount of such resistance, because the strips surround the window pane and are screwed together at their corners. However, with many channel-shaped strips, such as the window seal on the flange adjacent an automobile door, the strip must be attached securely enough that no additional screws or fastening means are needed to hold the strip on its flange.

The present invention provides a channel-shaped strip and flange structure in which the strip is securely fastened to the flange so that it can be pulled off only with a considerable and deliberate effort, yet the need for the customary metal carrier in such strips is obviated.

This is accomplished by providing a structural flange having its free end covered by a channel shaped strip, wherein the strip has a base portion, a flexible diaphragm joined to opposite sides of the base portion and forming an enclosed void with the base portion, and two leg portions also joined to opposite sides of the base portion where the diaphragm is joined to the base portion. The diaphragm engages the free end of the structural flange, and the leg portions extend over opposite sides of the flange. The invention is characterized by tabs joined to and protruding laterally from each side of the structural flange, these tabs having their free ends pointing away from the free end of the flange. A locking lip is joined to and extends laterally inwardly from each inside surface of each of the leg portions of the channel-shaped strip. These locking lips have their free ends pointing toward the flexible diaphragm of the channel-shaped strip, and the locking lips engage the tabs of the flange on the sides of the tabs facing the flange. The free end of the structural flange is pressed against the central part of the flexible diaphragm by the engagement of the locking lips with the tabs, so that the diaphragm flexes in the same direction as the free ends of the locking lips are pointing. This exerts a force against the free end of the structural flange in the same direction as the tabs are pointing. The locking lips are thus held locked to the tabs, and a considerable force is required to pull the lips off the tabs to remove the channel-shaped strip from the flange.

The channel-shaped strip may be made of either cellular or noncellular rubber, or the main body of the strip may be made of noncellular rubber and have a section of cellular rubber connected to and extending along side one of its leg portions.

These and other features, objects, and advantages of the present invention will be more apparent from the following detailed description and attached drawings, in which.

Figure 3:
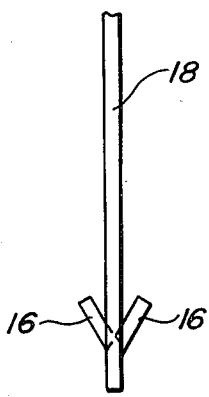
Figure 4:
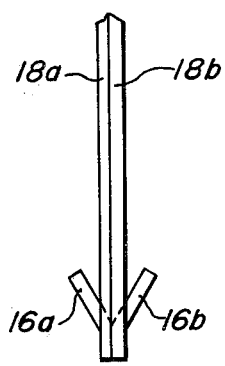
Figure 5:
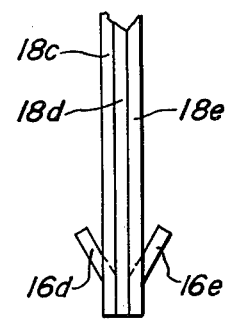
Figure 6:
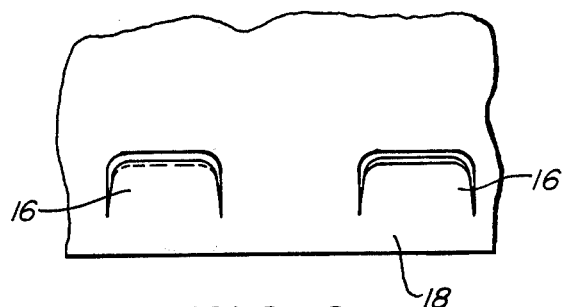
Figure 7:
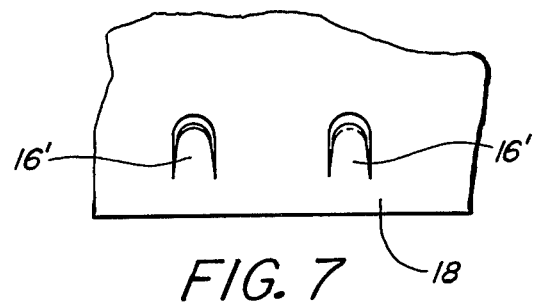
Figure 8:
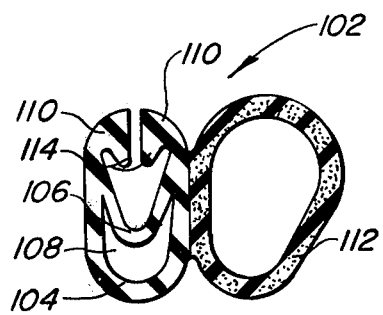
Figure 9:
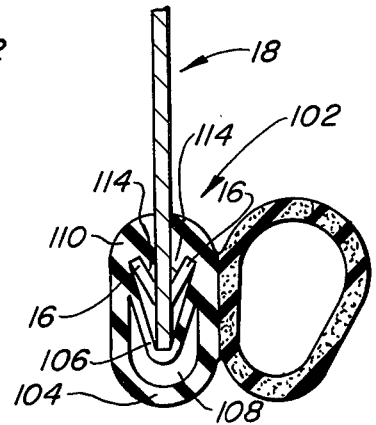
Figure 10:
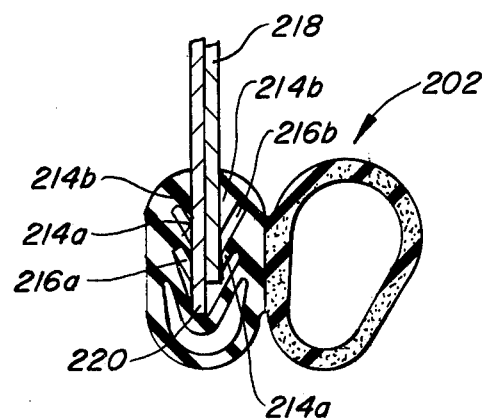
Figure 11:
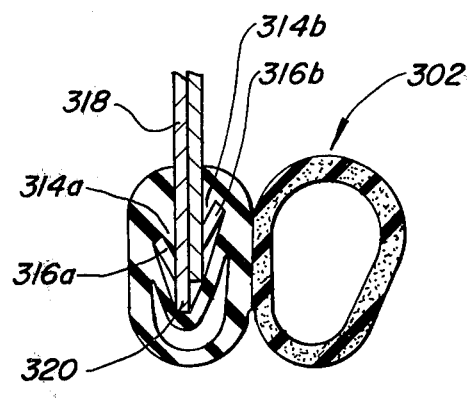

FIGS. 3, 4, and 5 are end views of various flange end structures which can form part of the present invention;

FIGS. 6 and 7 are side views of several flange end structures which can form part of the present invention;

FIG. 8 is a cross-sectional view of a channel-shaped strip illustrating a portion of a second embodiment of the present invention;

FIG. 9 is a cross-sectional view of the channel-shaped strip of FIG. 8 covering the end of a structural flange, and illustrating a second embodiment of the present invention;

FIG. 10 is a cross-sectional view of a channel-shaped strip and structural flange illustrating a third embodiment of the present invention; and FIG. 11 is a cross-sectional view of a channel-shaped strip and structural flange illustrating a fourth embodiment of the present invention.

Figure 1:
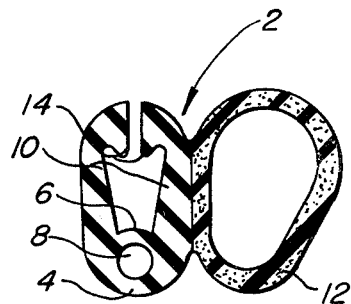
FIG. 1 is a cross-sectional view of a channel-shaped strip illustrating a portion of one embodiment of the present invention.

As shown in the cross-section of FIG. 1, the channel-shaped strip 2 has a base portion 4, and a flexible diaphragm 6 is joined to opposite sides of the base portion 4. An enclosed void 8 is formed between the diaphragm 6 and the base portion 4. Leg portions 10 are joined to the base portion 4 where the diaphragm 6 meets the base portion 4. The channel-shaped strip 2 is made suitable for sealing the space between a car door and the surrounding body frame by the connection of a tubular member 12 to the side of one of the leg portions 10.

Figure 2:
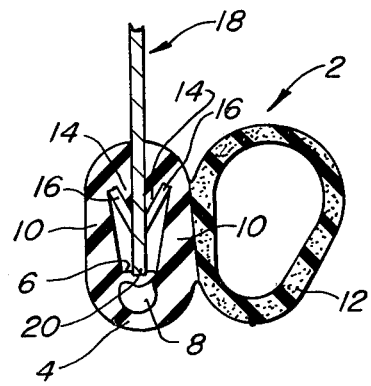
FIG. 2 is a cross sectional view of the channel-shaped strip of FIG. 1 covering the end of a structural flange, and illustrating one embodiment of the present invention.

Locking lips 14 are joined to the inside surface of each leg portion 10, and these locking lips are designed to engage tabs 16 on a structural flange 18, as shown in FIG. 2. The tabs 16 protrude from the flange 18 laterally and in an upwardly direction, away from free end 20 of flange 18. The positioning of the locking lips 14 with respect to the diaphragm 8 and the tabs 16 with respect to the free end 20 of flange 18 is such that when the tabs 16 engage the locking lips 14 as shown in FIG. 2, the central part of the diaphragm 8 flexes downwardly, or in the same direction as the locking lips 14 are pointing. This flexing, or buckling away from its natural upwardly bowed configuration causes the diaphragm 8 to exert a force against the free end 20 of the flange 18, which draws the locking lips 14 downwardly and keeps the lips 14 locked to the tabs 16.

When assembling the channel shaped strip 2 on the flange 18, the strip 2 is pushed on with the free end 20 of flange 18 fitting between the opening between the locking lips 14 on leg portions 10. The leg portions 10 flex somewhat as the locking lips 14 pass over the tabs 16. Meanwhile, the diaphragm 6 engages the free end 20 and flexes as the strip 2 is pushed further until the ends of the locking lips 14 pass the ends of the tabs 16. At this point, the diaphragm 6 is flexed to its greatest degree. Then, the locking lips 14 snap over the ends of tabs 16, and the pressure can be released from the strip 2, as the flexed diaphragm 6 will pull the locking lips 14 into secure engagement with the sides of the tabs 16 facing the flange 18. In this position, the channel-shaped strip 2 is securely held on the flange 18 and the locking lips 14 cannot be easily pried off, except by a considerable and deliberate effort. The best method of removing the strip 2 is to push on the base portion 4 of the strip 2 until the locking lips 14 are free of their engagement with the tabs 16, and then pry the locking lips 14 outwardly away from the flange 18.

From the foregoing description, it should be apparent that the void 8 between the diaphragm 6 and base portion 4 serves to allow room for the diaphragm 6 to flex without disrupting or interfering with the base portion 4, especially while the strip 2 is being mounted on or disengaged from the flange 18. The void 8 also allows for some tolerance in the spacing of the tabs 16 from the free end 20 of flange 18. In addition, the void 8 reduces the possibility of the channel-shaped strip being accidently disengaged by the bumping of base portion 4.

The channel-shaped strip 2 is shown in FIGS. 1 and 2 mounted on a flange 18 that is made of a single metal plate or sheet. This single plate form of the flange 18 is shown by itself in end view in FIG. 3, with the tabs 16 being cut out of the flange and bent to either side in alternating fashion as shown in the side view of FIG. 6. The tabs 16 may be either very wide as shown in FIG. 6, or they can be narrow tabs 16¹ as shown in FIG. 7. If the flange is made of two plates 18a and 18b as illustrated in FIG. 4, the tabs 16a and 16b may be located directly opposite each other. If the flange is made of three plates 18c, 18d, and 18e as shown in FIG. 5, the tabs 16c and 16d may be located directly opposite each other, and presence of the center plate 18d will prevent there being an open hole through the flange where the tabs are cut out of the outside plates 18c and 18e.

The embodiment of the invention shown in FIGS. 8 and 9 includes a channel-shaped strip 102 with a U-shaped base portion 104 and a flexible diaphragm 106 that tends to bulge downwardly toward the base portion 104. The result is an arcuate-shaped void 108 between the diaphragm 106 and base portion 104. Leg portions 110 extend only a small distance above the places where the diaphragm 106 and base portion 104 are joined, and locking lips 114 are located on the leg portions 110 adjacent to the juncture of the diaphragm 106 and base portion 104.

When the channel-shaped strip 2 is mounted on the flange 18 as shown in FIG. 9, the central part of the diaphragm 106 is extended further toward the base portion 104. With this construction, the diaphragm 106 can be designed so that it exerts quite a large force on the flange end 20 when it is stretched, resulting in a greater force holding the flange tabs 16 and locking lips 114 in engagement. However, a disadvantage with this embodiment is that if the flange is of only one sheet or plate and has alternately spaced tabs, then a moment is created at the tab ends which tends to rotate the base portion 104 of channel-shaped strip 102 toward whichever side of the flange 18 the tab is located. On the other hand, there is no such problem with this embodiment when flanges are used that have their tabs placed directly opposite each other, such as the flanges of FIGS. 4 and 5.

The channel-shaped strip 202 in FIG. 10 is designed for mounting on a flange 218 which has tabs 216a and 216b located at different distances from the flange end 220. In this case, the strip 202 has two locking lips 214a and 214b on each of its leg portions 210. In other respects, the channel-shaped strip 202 is similar to the channel-shaped strip 102 of FIGS. 8 and 9. The different locations of the locking lips 214a and 214b allow the strip 202 to be mounted on a flange 218 when the tabs 216a and 216b are in either of two locations with respect to the flange end 220. In the case shown in FIG. 10, the tab 216a on the left engages the lower locking lip 214a and the tab 216b on the right engages the upper locking lip 214b. Since the flange 218 is made of two metal sheets, the tabs 216a and 216b may be placed directly opposite each other in the lengthwise direction of the flange, so as to reduce the tendency of the strip to rotate.

With the embodiment of the invention shown in FIG. 11, the channel-shaped strip 302 is designed specifically for a flange 318 that has tabs 316a and 316b spaced at different distances from the free end 320 of the flange. Locking lips 314a and 314b engage the tabs 316a and 316b in the same manner as locking lips 214a and 214b engage the tabs 216a and 216b in the embodiment of FIG. 10.

While the channel-shaped strip is all of the foregoing embodiments has been shown made of a main body of non-cellular rubber with a tubular member of cellular rubber attached to one of its legs, the compositions of both parts of the strip may be varied. For instance, the entire strip may be made of cellular rubber, or the main body of the strip may be made of plastic rather than rubber. Also, the strip may be made without any attached tubular member, especially if the function of the strip is more for protective or decorative purposes, rather than for sealing engagement with a door window pane or the like.

While several embodiments of the present invention have been shown and described, other embodiments and modifications will of course be apparent to those skilled in the art, while remaining within the scope of the appended claims.

I claim:

1. A structural flange having its free end covered by a channel-shaped strip, said channel-shaped strip having a base portion, a flexible diaphragm joined to opposite sides of said base portion and forming an enclosed void with said base portion, said flexible diaphragm engaging said free end of said structural flange, and two leg portions also joined to opposite sides said base portion where said diaphragm is joined to said base portion, said leg portions extending over opposite sides of said flange and away from said base portion and said diaphragm of said channel-shaped strip, characterized by:
   (a) a tab joined to and protruding laterally from each side of said structural flange, said tabs having their free ends pointing away from said free end of said flange;
   (b) a locking lip joined to and extending laterally inwardly from each inside surface of each of said leg portions of said channel-shaped strip, said locking lips having their free ends pointing toward said flexible diaphragm of said channel-shaped strip and engaging said tabs on the sides of said tabs facing said structural flange; and
   (c) said free end of said structural flange being pressed against the central part of said flexible diaphragm by the engagement of said locking lips with said tabs, so that said diaphragm flexes in the same direction that said free ends of said locking lips are pointing and exerts a force against said free end of said structural flange in the same direction that said free ends of said tabs are pointing.

2. The structural flange and channel-shaped strip according to claim 1 further characterized by said flexible diaphragm of said channel-shaped strip have a central part that tends to bulge toward said free end of said structural flange and responds to being pressed by said free end of said structural flange by buckling toward said base portion of said channel-shaped strip.

3. The structural flange and channel-shaped strip according to claim 1 further characterized by said flexible diaphragm of said channel-shaped strip being joined to said base portion and said leg portions at locations adjacent to where said locking lips are joined to said inside surface of said leg portions, said flexible diaphragm of said channel-shaped strip having a central part that tends to bulge toward said base portion of said channel-shaped strip and responds to being pressed by said free end of said structural flange by being stretched further toward said base portion and away from said locking lips of said channel-shaped strip.

4. The structural flange and channel-shaped strip according to claim 1 or claim 3, further characterized by said tabs on opposite sides of said structural flange being positioned at different distances from said free end of said structural flange.

5. The structural flange and channel-shaped strip according to claim 1 further characterized by two of said locking lips being joined to and extending inwardly from each inside surface of each of said leg portions of said channel-shaped strip, said locking lips joined to each of said leg portions being spaced at different distances from said flexible diaphragm, and said tabs on opposite sides of said structural flange being positioned so that the tab on one side of said structural flange is engaged by the locking lip on one leg portion that is nearest to said flexible diaphragm and the tab on the other side of said structural flange is engaged by the locking lip on the other leg portion that is farthest from said flexible diaphragm.

6. The structural flange and channel-shaped strip according to claim 1, claim 2, or claim 5 further characterized by there being a plurality of said tabs located on each side of said structural flange, said tabs on each side of said flange being arranged in a row along a line parallel to said free end of said flange, said tabs on opposite sides of said flange being arranged in pairs with each tab on one side of said flange being directly opposite a tab on the other side of said flange.

7. The structural flange and channel-shaped strip according to claim 1 or claim 3 further characterized by there being a plurality of said tabs located on each side of said flange being arranged in a row along a line parallel to said free end of said structural flange, said tabs on opposite sides of said flange being arranged alternatingly with each tab on one side of said flange being opposite a space between two tabs on the other side of said flange.

8. The structural flange and channel-shaped strip according to claim 1 further characterized by said channel-shaped strip being made of noncellular rubber.

9. The structural flange and channel-shaped strip according to claim 1 further characterized by said channel-shaped strip being made of cellular rubber.

10. The structural flange and channel-shaped strip according to claim 1 further characterized by said channel-shaped strip being made of plastic.

11. The structural flange and channel-shaped strip according to claim 1 further characterized by said channel-shaped strip having said base portion, said flexible diaphragm, said leg portions, and said locking lips made of noncellular rubber and having a section of cellular rubber connected to and extending along side one of said leg portions.

* * * * *